Patented Mar. 4, 1952

2,587,641

UNITED STATES PATENT OFFICE 2,587,641

1-p-NITROPHENYL - 2 - DIHALOACETAMIDO-PROPANE-1,3-DIOL CYCLIC CARBONATE AND SULFITE

George W. Moersch and Allen C. Moore, Detroit, Mich., assignors to Parke, Davis & Company, Detroit, Mich., a corporation of Michigan No Drawing. Application May 25, 1950, Serial No. 164,298

6 Claims. (Cl. 260—327)

1

This application is a continuation-in-part of our copending application Serial No. 66,594, filed December 21, 1948, now Patent No. 2,513,346 issued July 4, 1950, and the invention relates to heterocyclic compounds which possess valuable antibiotic properties and to methods for obtaining the same. More particularly, the invention relates to heterocyclic compounds having the formula,

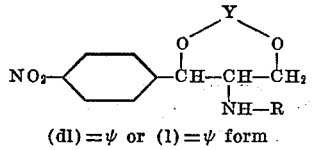

(dl) = $\psi$ or (l) = $\psi$ form where R is a halogenated acetyl radical; Y is a —SO— or —CO— group; and the notations (dl)-$\psi$ and (l)-$\psi$ designate the diastereoisomeric and optical isomeric forms. The $\psi$ (pseudo) diastereoisomers with which this invention is concerned are those products of the above formula wherein the p-nitrophenyl and —NH—R groups lie on opposite sides of the plane of the heterocyclic ring. The symbols (dl) and (l) have their usual significance, that is, (dl) indicates that the compound is optically racemic while (l) indicates that the compound rotates the plane of polarized light to the left.

In accordance with the invention products of the above formula are obtained by reacting a 1 - p - nitrophenyl - 2 - haloacetamidopropane-1,3-diol of formula,

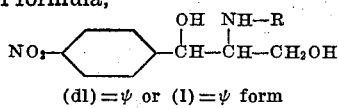

(dl) = $\psi$ or (l) = $\psi$ form with a halide compound of formula,

where X is a halogen atom and R and Y have the same significance as given above. The reaction is carried out at a temperature between about 20 and 50° C. and in the presence or absence of a substantially anhydrous, inert organic solvent such as chloroform, methylene dichloride, ethylene dichloride, benzene, xylene, carbon tetrachloride, ether, toluene and the like. In general, the preferred temperature for the reaction is in the neighborhood of 25 to 35° C. The relative quantities of the reactants can be varied within rather wide limits. However, for economic reasons, as well as ease of purification of

2 the products, an excess of the halide compound is generally employed. In the case of the thionyl halides (where Y=—SO—) one of the most convenient methods for carrying out the reaction involves the use of sufficient thionyl halide to act as a reaction medium or solvent, four to six parts by weight for each part by weight of the acylamido diol compound being the preferred quantity of thionyl halide in the instance.

When using a carbonyl halide (where Y=—CO—)

the reaction can also be carried out under aqueous conditions. This is preferably done by employing a two-phase reaction mixture, one phase consisting of one of the afore mentioned organic solvents and the other phase consisting of water containing a weakly alkaline material such as calcium carbonate, calcium hydroxide, magnesium carbonate, sodium bicarbonate and the like to take up the hydrogen halide formed during the reaction.

The products of the invention possess valuable antibiotic properties. They are tasteless and hence can be administered orally in the form of uncoated pills or incorporated into elixirs, syrups and candies suitable for administration to young children. They are relatively non-toxic and are sufficiently stable to permit their use in syrups and elixirs without loss of their antibiotic activity.

The invention is illustrated by the following examples.

*Example 1*

5 g. of chloramphenicol [(1)-$\psi$-1-p-nitrophenyl - 2 - dichloroacetamidopropane - 1,3-diol] is added in small portions with stirring to 15 cc. of thionyl chloride at 30 to 33° C. The solid dissolves completely and then the crystalline product starts to separate from the solution. After twenty minutes the slurry is diluted with 100 cc. of dry ether, chilled and the solid collected. The crude cyclic sulfite of (l)-$\psi$-1-p-nitrophenyl - 2 - dichloroacetamidopropane - 1,3-diol so obtained melts at 164–7° C. Two recrystallizations from ethanol raise the melting point to 171–2° C. This product has the formula,

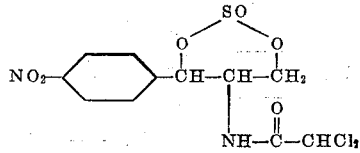

(l) = $\psi$ form

Example 2

5 g. of (dl)-ψ-1-p-nitrophenyl-2-dichloroacetamidopropane-1,3-diol is added in small portions with stirring to 15 cc. of thionyl chloride at 30° C. After about twenty minutes the reaction mixture is diluted with 100 cc. of anhydrous ether and the solid product collected; M. P. 148–50° C. Recrystallization from ethanol yields the desired cyclic sulfite of (dl)-ψ-1-p-nitrophenyl-2-dichloroacetamidopropane-1,3-diol in pure form; M. P. 175–6° C. The formula of this product is,

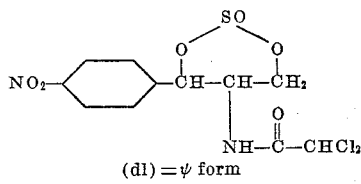

(dl) = ψ form

Example 3

5 g. of (l)-ψ-1-nitrophenyl-2-dibromoacetamidopropane-1,3-diol is added in small portions with stirring to 15 cc. of thionyl chloride at 35° C. After about twenty minutes the reaction mixture is diluted with 100 cc. of dry benzene and the solid product collected. Recrystallization from ethanol yields the desired cyclic sulfite of (l)-ψ-1-p-nitrophenyl-2-dibromoacetamidopropane-1,3-diol in pure form. The formula of this product is,

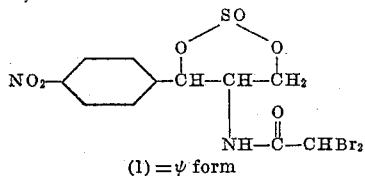

(l) = ψ form

Example 4

7.5 g. of (dl)-ψ-1-p-nitrophenyl-2-dibromoacetamidopropane-1,3-diol is added in small portions with stirring to 20 cc. of thionyl chloride at 30° C. After about one-half hour the reaction mixture is diluted with 100 cc. of anhydrous ether and the solid product collected. Recrystallization from ethanol yields the desired cyclic sulfite of (dl)-ψ-1-p-nitrophenyl-2-dibromoacetamidopropane-1,3-diol in pure form. The formula of this product is,

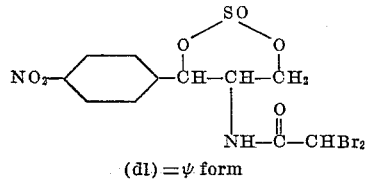

(dl) = ψ form

Example 5

3 g. of (l)-ψ-1-p-nitrophenyl-2-difluoroacetamidopropane-1,3-diol is added in small portions with stirring to 10 cc. of thionyl chloride at 30° C. After about one-half hour the reaction mixture is diluted with 100 cc. of anhydrous ether and the solid product collected. Recrystallization from ethanol yields the desired cyclic sulfite of (l)-ψ-1-p-nitrophenyl-2-difluoroacetamidopropane-1,3-diol in pure form. The formula of this product is,

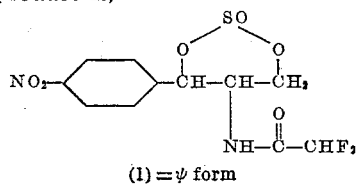

(l) = ψ form

Example 6

5 g. of (dl)-ψ-1-p-nitrophenyl-2-difluoroacetamidopropane-1,3-diol is added in small portions with stirring to 15 cc. of thionyl chloride at 35° C. After about twenty minutes the reaction mixture is diluted with 100 cc. of dry benzene and the solid product collected. Recrystallization from ethanol or methanol yields the desired cyclic sulfite of (dl)-ψ-1-p-nitrophenyl-2-difluoroacetamidopropane-1,3-diol in pure form. The formula of this product is,

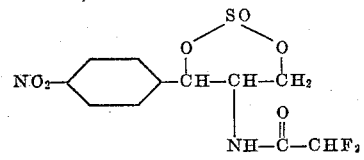

(dl) = ψ form

Example 7

5 g. of (l)-ψ-1-p-nitrophenyl-2-chloroacetamidopropane-1,3-diol is added in small portions with stirring to 15 cc. of thionyl bromide at 30° C. After about twenty minutes the reaction mixture is diluted with 100 cc. of anhydrous ether and the solid product collected. Recrystallization of this product from ethanol yields the desired cyclic sulfite of (l)-ψ-1-p-nitrophenyl-2-chloroacetamidopropane-1,3-diol in pure form. The formula of this product is,

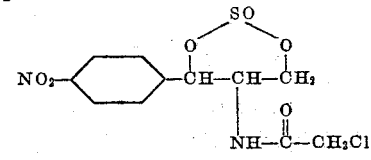

(l) = ψ form

Example 8

3 g. of (dl)-ψ-1-p-nitrophenyl-2-chloroacetamidopropane-1,3-diol is added in small portions with stirring to 10 cc. of thionyl chloride at 35° C. After about one-half hour the reaction mixture is diluted with 75 cc. of dry xylene and the solid product collected. Recrystallization of this product from ethanol yields the desired cyclic sulfite of (dl)-ψ-1-p-nitrophenyl-2-chloroacetamidopropane-1,3-diol in pure form. This product has the formula,

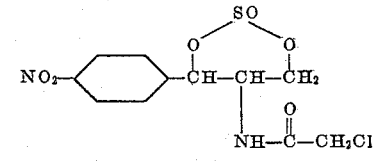

(dl) = ψ form

Example 9

5 g. of (l)-ψ-1-p-nitrophenyl-2-fluoroacetamidopropane-1,3-diol is added to 15 cc. of thionyl chloride at 28° C. with stirring. After about one-half hour the reaction mixture is diluted with 100 cc. of anhydrous ether and the solid product collected. Recrystallization from methanol or ethanol yields the desired cyclic sulfite of (l)-ψ-1-p-nitrophenyl-2-fluoroacetamidopropane-1,3-diol in pure form. This product has the formula,

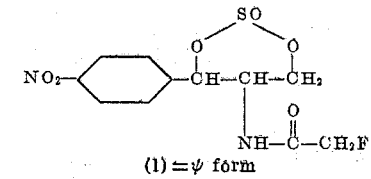

(l) = ψ form

Example 10

3 g. of (dl)-ψ-1-p-nitrophenyl-2-fluoroacetamidopropane-1,3-diol is added in small portions with stirring to 10 cc. of thionyl bromide at 32° C. After stirring for about twenty minutes the reaction product is separated by dilution with ether and followed by filtration. Recrystallization of this crude product from ethanol yields the desired cyclic sulfite of (dl)-ψ-1-p-nitrophenyl-2-fluoroacetamidopropane-1,3-diol in pure form. This product has the formula,

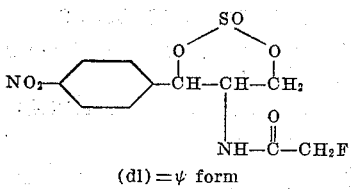

(dl) = ψ form

Example 11

7.5 g. of (dl)-ψ-1-p-nitrophenyl-2-iodoacetamidopropane-1,3-diol is added in small portions with stirring to 20 cc. of thionyl chloride at 30° C. After about one-half hour the reaction mixture is diluted with 100 cc. of anhydrous ether and the solid product collected. Recrystallization of this crude product from ethanol yields the desired cyclic sulfite of (dl)-ψ-1-p-nitrophenyl-2-iodoacetamidopropane-1,3-diol in pure form. This product has the formula,

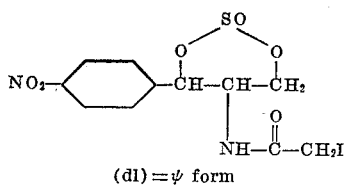

(dl) = ψ form

Example 12

5 g. of (l)-ψ-1-p-nitrophenyl-2-fluorochloroacetamidopropane-1,3-diol is added in small portions with stirring to 15 cc. of thionyl chloride at 35° C. After about twenty minutes the reaction mixture is diluted with 100 cc. of anhydrous benzene and the solid product collected. Crystallization of the product from ethanol or methanol yields the desired cyclic sulfite of (l)-ψ-1-p-nitrophenyl-2-fluorochloroacetamidopropane-1,3-diol in pure form. This product has the formula,

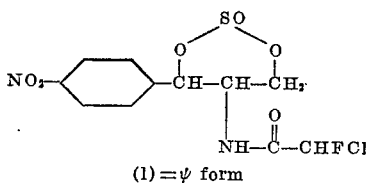

(l) = ψ form

Example 13

5 g. of finely powdered chloramphenicol is added in small portions with stirring to 30 cc. of a 35% phosgene in ethylene dichloride at room temperature. The reaction effervesces vigorously during the addition. After about one-half hour the reaction mixture is evaporated to dryness and the residual oil taken up in and crystallized from dilute ethanol. Recrystallization from ethanol yields the desired cyclic carbonate of (l)-ψ-1-p-nitrophenyl-2-dichloroacetamidopropane-1,3-diol in pure form. The formula of this product is,

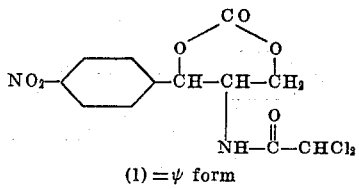

(l) = ψ form

Example 14

4.1 g. of (dl)-ψ-1-p-nitrophenyl-2-dichloroacetamidopropane-1,3-diol is dissolved in ethylene dichloride and the solution slurried with 5 g. of calcium carbonate and 100 cc. of water. An excess of phosgene (a total of 3 g.) is passed into the vigorously stirred mixture. After one-half hour the layers are allowed to separate and the organic layer separated along with any water-insoluble material. The organic layer is evaporated to dryness in vacuo below 20° C. and the residue taken up in and crystallized twice from absolute ethanol. The product thus obtained is the cyclic carbonate of (dl)-ψ-1-p-nitrophenyl-2-dichloroacetamidopropane-1,3-diol which has the formula,

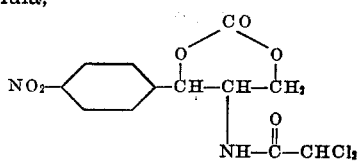

(dl) = ψ form

Example 15

3 g. of (d)-ψ-1-p-nitrophenyl-2-dichloroacetamidopropane-1,3-diol is added in small portions to 20 cc. of a 30% phosgene in ethylene dichloride at room temperature. After the addition has been completed the reaction mixture is allowed to stand for one-half hour and then evaporated to dryness. The residue is taken up in and crystallized from dilute ethanol. Recrystallization from ethanol yields the desired cyclic carbonate of (d)-ψ-1-p-nitrophenyl-2-dichloroacetamidopropane-1,3-diol in pure form. The formula of this product is,

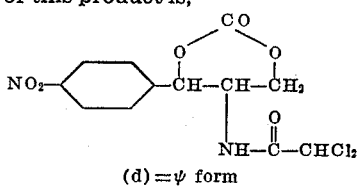

(d) = ψ form

What we claim is:

1. A compound of the class consisting of the (dl)-ψ and (l)-ψ forms of a compound of the formula,

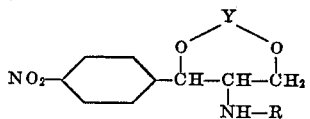

where R is a halogenated acetyl radical and Y is a member of the class consisting of —SO— and —CO— groups.

2. A compound of the formula,

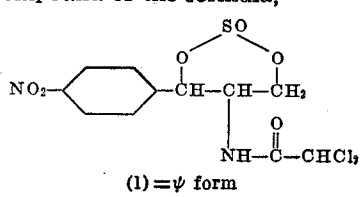

(l) = ψ form

3. A compound of the formula,
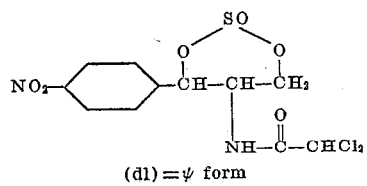
(dl) = ψ form
4. A compound of the formula,
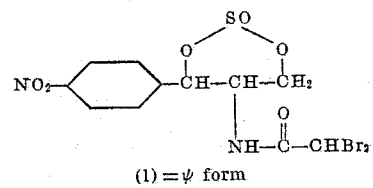
(l) = ψ form
5. A compound of the formula,
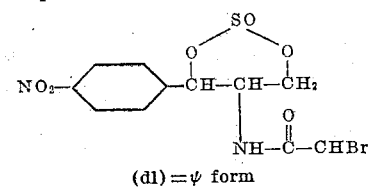
(dl) = ψ form
6. A compound of the formula,
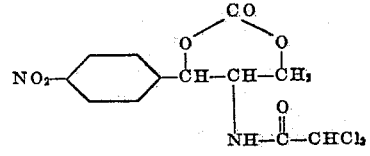
(l) = ψ form
GEORGE W. MOERSCH.
ALLEN C. MOORE.
REFERENCES CITED
The following references are of record in the file of this patent:
UNITED STATES PATENTS
| Number | Name | Date |
|---|---|---|
| 2,471,274 | Lingo | May 24, 1949 |
| 2,513,346 | Moersch | July 4, 1950 |